United States Patent [19]

Albou et al.

[11] Patent Number: 5,065,072

[45] Date of Patent: Nov. 12, 1991

[54] POWER SUPPLY CIRCUIT FOR AN ARC LAMP, IN PARTICULAR FOR A MOTOR VEHICLE HEADLIGHT

[75] Inventors: Pierre Albou, Paris; Joël Leleve, Epinay-sur-Seine, both of France

[73] Assignee: Valeo Vision, Bobigny Cedex, France

[21] Appl. No.: 500,290

[22] Filed: Mar. 28, 1990

[30] Foreign Application Priority Data

Mar. 31, 1989 [FR] France .............................. 89 04308
Nov. 24, 1989 [FR] France .............................. 89 15486

[51] Int. Cl.$^5$ ........................................ B60Q 1/02
[52] U.S. Cl. ................................. 315/82; 315/83; 315/254; 315/289; 315/307; 315/DIG. 7
[58] Field of Search ................. 315/82, 80, 307, 77, 315/DIG. 7, 289, 254

[56] References Cited

U.S. PATENT DOCUMENTS

| | | | |
|---|---|---|---|
| 3,691,450 | 9/1972 | Cox | 315/45 R |
| 3,746,921 | 7/1973 | Marshall et al. | 315/246 |
| 4,791,338 | 12/1988 | Dean et al. | 315/174 |
| 4,841,198 | 6/1989 | Wilhelm | 315/82 |
| 4,857,754 | 8/1989 | Yamamoto | 307/10.8 |
| 4,902,938 | 2/1990 | Lindquist | 315/307 |
| 4,914,356 | 4/1990 | Cockram | 315/307 |
| 4,935,862 | 6/1990 | Herbsleb et al. | 363/132 |

FOREIGN PATENT DOCUMENTS

2934942 4/1981 Fed. Rep. of Germany .
2120870 7/1983 United Kingdom .
2204751 11/1988 United Kingdom .

Primary Examiner—Eugene R. Laroche
Assistant Examiner—Son Dinh

[57] ABSTRACT

A power supply circuit for an arc lamp, in particular for a motor vehicle headlight, the power supply circuit being wherein it comprises: means for converting electricity from a low voltage DC supply such as a vehicle battery into an alternating voltage of amplitude which is variable as a function of the state of the lamp; and a voltage-raising transformer, the variable alternating voltage being applied to the primary winding of the transformer and the lamp being connected to the terminals of the secondary winding of the transformer, either directly or else by means of non-inductive components. Optionally, the circuit includes means for generating first voltage pulses across the terminal of at least one capacitor and for applying them to the lamp for the purpose of striking an arc in the lamp, and for generating second voltage pulses for maintaining the arc after it has been struck on the basis of a current flowing through at least one inductance and under the control of switch means including at least two switches controlled as a function of the value of the current flowing through the lamp. The invention is applicable to powering the lamps of motor vehicle headlights.

13 Claims, 5 Drawing Sheets

FIG_1

FIG_2a

FIG_2b

FIG_2c

FIG_3

FIG_4

FIG_6

FIG_7

POWER SUPPLY CIRCUIT FOR AN ARC LAMP, IN PARTICULAR FOR A MOTOR VEHICLE HEADLIGHT

The present invention relates in general to a power supply circuit for an arc lamp, and in particular for an arc lamp of a motor vehicle headlight.

BACKGROUND OF THE INVENTION

It is well known, that because of its particular type of operation, an arc lamp requires very special power supply conditions. Three stages can be distinguihsed in the operation of such a lamp. Firstly, in order to switch the lamp on, it is necessary to apply a high voltage thereto, preferably an alternating voltage, and having an amplitude of about 9 kV to 12 kV.

Once the arc has been struck, it is necessary, temporarily, to deliver high current at low voltage in order to bring the lamp as quickly as possible up to its nominal temperature (and this requirement is particularly important for car lighting).

Finally, once this temperature has been reached, the lamp must be powered at a similar voltage but with lower current.

One known circuit that attempts to come close to the above conditions comprises an alternating voltage generator for generating a few tens of volts at variable frequency. The output from the generator is fed to an LC resonant circuit and the lamp is connected to the terminals of the capacitor.

For striking, the frequency of the generator is chosen to be close to resonance of the LC circuit. An appropriately raised voltage then appears across the terminals of the lamp. Once the arc has been struck, the frequency of the generator is lowered so as to move away from resonance conditions, thereby reducing the voltage across the terminals of the lamp.

Such a circuit suffers from a major drawback, in particular when used in motor vehicles, in that when the voltage is increased for the purpose of striking the arc, a large current flows simultaneously through the inductor and the capacitor.

In practice, the power consumption during this stage rises to about 250 watts, and if the lamp does not light immediately, then the time this stage lasts is incompatible with the amount of electricity available on board a vehicle.

In addition, such a circuit requires a capacitor which is capable of withstanding the high voltage applied to the lamp, and as this is disadvantageous both with respect to cost and with respect to bulk.

The present invention seeks to mitigate these drawbacks of the prior art and to provide a power supply circuit which consumes relatively little power during the arc-striking stage (only a few tens of watts), and which does not require a capacitor having a very high breakdown voltage. More generally, the present invention seeks to provide a circuit which is cheap, which uses components that are simple and not expensive, and which is nevertheless very flexible in providing the voltages required for the various operating stages.

SUMMARY OF THE INVENTION

To this end, the present invention provides a power supply circuit for an arc lamp, in particular for a motor vehicle headlight, the power supply circuit comprising:

means for generating from a low voltage DC supply such as a vehicle battery an alternating voltage of amplitude which is variable as a function of the state of the lamp; and a voltage-raising transformer, said variable alternating voltage being applied to the primary winding of the transformer and the lamp being connected to the terminals of the secondary winding of the transformer, either directly or else by means of non-inductive components.

In a second aspect, the present invention provides a power supply circuit for an arc lamp, in particular a motor vehicle headlight, the power supply circuit comprising:

pulse generating means for generating first voltage pulses across the terminals of at least one capacitor and for applying them to the lamp in order to strike an arc in the lamp, and for generating second voltage pulses for maintaining the arc in the lamp once struck, said pulses being derived from a current flowing through at least one inductance under the control of switch means comprising at least two switches controlled as a function of the value of the current flowing through the lamp.

Advantageously, the pulse generator means comprise a first generator including a series connection of an inductance and the first capacitor, said series connection being connected to the terminals of a DC voltage source, the first controlled switch being connected in parallel with the said first capacitor; and a second generator comprising a series connection of said inductance, the primary winding of a transformer, and a second capacitor, the second series connection being likewise connected to the terminals of said voltage source, the second controlled switch being connected in parallel with the second capacitor; with the lamp being connected to the terminals of the secondary winding of the transformer.

BRIEF DESCRIPTION OF THE DRAWINGS

Embodiments of the invention are described by way of example with reference to the accompanying drawings, in which.

DETAILED DESCRIPTION

It should firstly be observed that elements or portions which are identical or similar from one figure to another are designated wherever possible by means of the same references.

Figure 1:
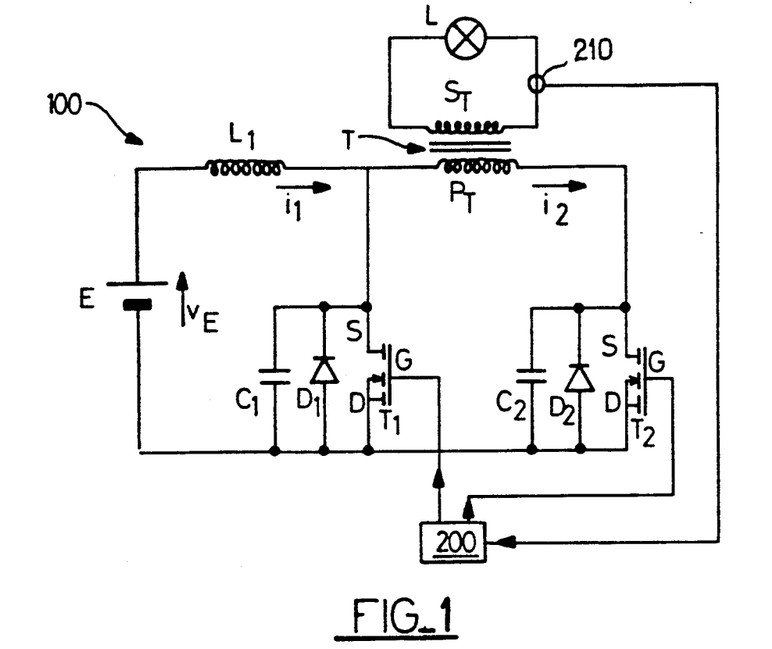
FIG. 1 is a circuit diagram of a first practical embodiment of an arc lamp power supply circuit of the invention.

The description begins with a basic embodiment of the invention as shown in FIG. 1.

A first terminal of an inductor L1 is connected to the positive terminal of a low voltage DC source E (in particular the battery of the vehicle in which the lamp and the power supply circuit are mounted), and the second terminal of L1 is connected firstly to the first terminal of the primary winding PT of a transformer T, and secondly to the cathode of a first diode D1 and to the first terminal of a first capacitor C1. The second terminal of C1 and the anode D1 are connected to the negative terminal of E. A first field effect transistor (FET) T1 has its source connected to the cathode of D1 and to the first terminal of C1, its drain connected to the negative terminal of E, and its grid connected to a first output terminal of a control circuit represented by a block 200.

The second terminal of the primary winding PT of T is connected to the first terminal of the second capacitor C2, to the cathode of a second diode D2, and to the source of a second FET T2. These three components are likewise connected in parallel with the second component of C2, the anode D2, and the drain of T2 being connected all three to the negative terminal of E.

The grid of T2 is connected to a second output terminal of the control circuit 200.

The lamp L is connected between the terminals of the secondary winding ST of the transformer T.

Finally, the circuit 200 is connected to a detector 210 for detecting the current flowing in the secondary winding ST of T.

In accordance with an essential aspect of the invention, transistors T1 and T2 act as controlled switches which are opened and closed under the control of the circuit 200 as a function of the operating state of the circuit load L.

Initially, L is not switched on and presents infinite impedance ZL since there is no arc established between its electrodes.

During this stage, a high alternating voltage may be desired across the terminals of L in order to strike an arc. This is performed as follows, with reference being made simultaneously to FIG. 1 and to FIG. 2a.

It is assumed that the circuit is initially under steady state conditions, i.e. D1 is conducting, with a negative current written i1 passing through L1 and a positive magnetizing current $i2=i\mu$ passing through PT (with the positive direction being illustrated by the arrows in FIG. 1).

At an initial instant t0, the positive current that was flowing through PT charges C2 and decreases with the loop constituted by PT, C2, T1, and D1 being closed because D1 is conducting. The voltage v2 across C2 then rises to a maximum V2, after which it falls off to zero. Simultaneously, i1 increases linearly as a function of time and becomes positive, with the circuit E, L1, and D1 likewise being closed.

Figure 2A:
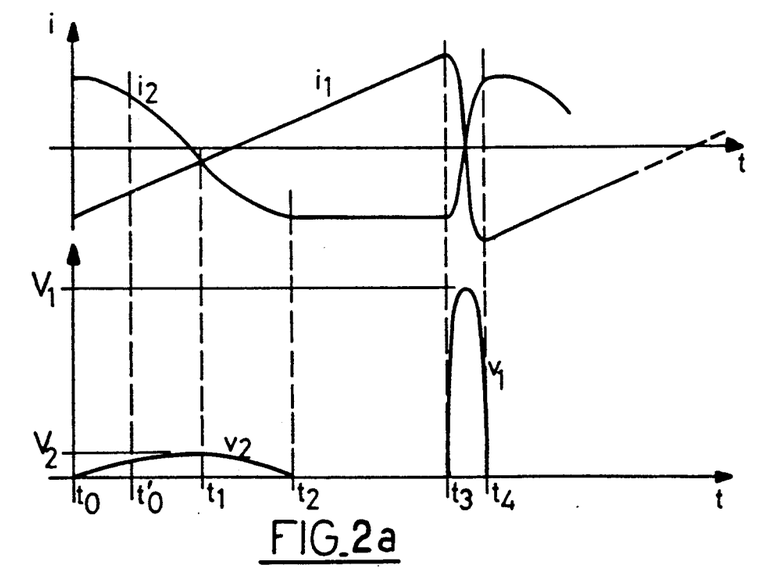
FIGS. 2a and 2c are waveform diagrams illustrating the operation of the circuit of FIG. 1.

In addition, the circuit 200 is adapted to switch on T1 at any appropriate instant while D1 is conducting (e.g. at instant t0' in FIG. 2a). The switching on of this transistor has no concrete effect since D1 is already conducting and continues to conduct.

When the current in D1 cancels (i2=i1) at instant t1, then D1 is reverse-biased and conduction then continues to be provided by T1.

When v2 becomes zero (at instant t2) after the current i2 has reversed, D2 starts conducting and PT is then short-circuited via D2 and T1. The current i2 then remains constant (ignoring losses) at a negative value.

At a second instant (instant t3) T1 is switched off and T2 is switched on. The currents i1 and i2 then quickly charge C1 and the voltage v1 across its terminals increases rapidly to a maximum (surge voltage V1), after which the values of i1 and i2 fall off rapidly.

v1 then drops to 0, while the currents i1 and i2 are approximately reversed in sign.

D1 then conducts again. i1 then increases linearly as described above, while i2 remains essentially constant, given that the terminals of PT are short circuited via D1 and T2.

Thus, at instant t4 the circuit is back in its initial state as described above, and the cycle is repeated by switching off T2 at said instant t4 and by switching on T1 at a determined instant later on.

Thus, during each cycle, the surge voltage V1 generated across C1 is applied to the terminals of PT via ON switch T2.

By selecting appropriate values for the components and for the step-up ratio of T, the alternating high tension required for striking an arc is generated across the terminals of L.

(It should be observed that by selecting components capable of withstanding the high voltages required for striking an arc in the lamp, it would be possible to omit the voltage step-up factor provided by the transformer T, and thus to omit the transformer as well.)

For example, with vE=24 volts, it is possible to generate a surge voltage V1 of about 1 kV, and using a transformer having a step-up ratio m=10, it is possible to generate a succession of short-duration surge voltage peaks having a value of about 10 kV across the terminals of L, thereby striking an arc after number of cycles.

It may be observed here that T1 must be selected to be capable of withstanding a relatively high positive voltage ($\approx$V1) across its terminal, and to be capable of switching off fast.

However, it may present relatively high resistance in the on condition (e.g. 6 $\Omega$ to 7 $\Omega$) since it is required to conduct limited current only.

In contrast, T2 is not subjected to high voltage and may switch relatively slowly. However it must present low loss when conducting, since the maximum nominal current of the converter passes therethrough.

Thus, it is possible to make use of transistors which are relatively cheap, since neither of them is required to present all three of the following qualities: good conductivity; high speed switching; and the ability to withstand high voltages.

It may also be observed that during the above-described arc-striking stage, the switching of T1 and T2 is gentle: when switched off, each of them has a discharged capacitor across its terminals, and when switched on, each of them has a conducting diode across its terminals.

Switching losses are thereby minimized, thus minimizing heating of T1 and T2.

Finally, it may be observed that it is necessary each time to ensure that T2 is switched off a short period of time before T1 is switched on so that T2 is not destroyed by the voltage pulses generated by T1.

Once the striking stage has struck an arc in the lamp, the lamp has an arc between its electrodes and presents a given resistance rL. Current flows in the secondary winding of the transformer, and this current, as reflected in the primary winding, is written iL. Thus i2 is equal to $iL+i\mu$.

The operation of the circuit during this second stage is described below with reference to FIGS. 1, 2b, and 2c.

Initially, as soon as the detector 210 has detected that an arc has been struck, T2 should be kept switched on for a sufficient length of time to satisfy the current demand by the transformer, and more precisely to provide the lamp with enough current to ensure that the arc is established stably. During this intermediate stage, T1 is kept off.

After this stage, T2 is excited by a control signal having a high duty ratio so as to switch it alternately off and on.

Figure 2B:
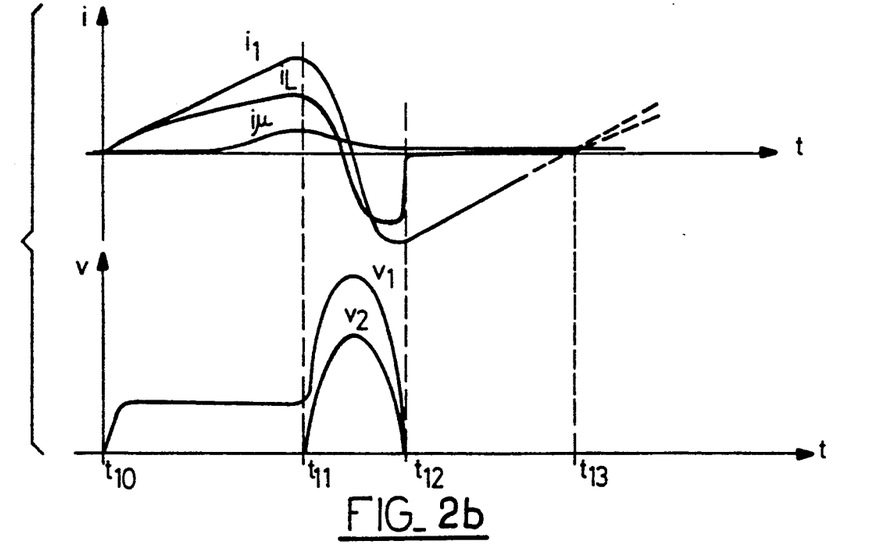
Figure 2C:
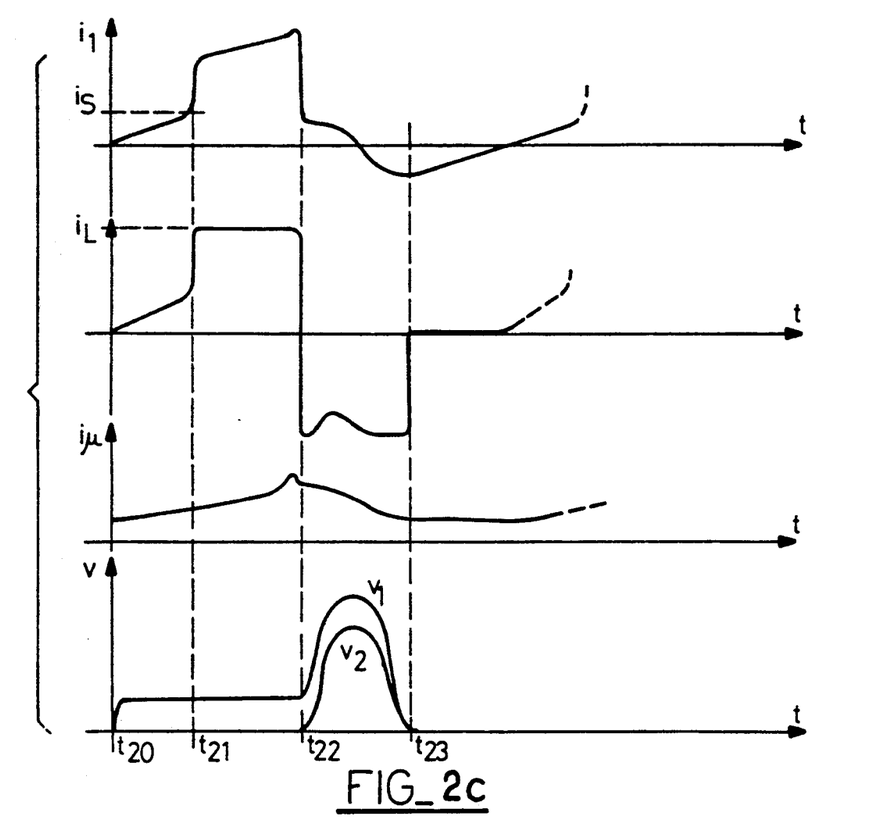

Depending on whether or not the inductor L1 saturates or does not saturate, the circuit operates in two different ways (shown respectively in FIGS. 2b and 2c).

Initially (instant t10 in FIG. 2b), T2 is on. So long as L1 is not saturated, the current i1 flowing through L1, PT, and L increases. D1 is reverse-biased and does not conduct.

When T2 is switched off (instant t11), it may be assumed that L1 "discharges" into the circuit constituted by C1 connected in parallel with a series connection comprising a resistance equal to $r/m^2$ and C2. i1 thus falls off relatively quickly. The current i2 also falls off, but relatively slowly. When the voltage across the terminals of C1 becomes zero, D1 starts to conduct (instant t12). At practically the same instant, the voltage across C2 cancels and D2 starts conducting.

The winding PT is thus short-circuited and the voltage across the terminals of the load is zero.

Then, at instant t13, T2 is switched on again, thereby returning to the same conditions as at t10.

The waveform diagram of FIG. 2b shows that relatively narrow voltage peaks are thus applied to the lamp, at a relatively low voltage level across the terminals of the lamp, e.g. about 80 volts, thus constituting the stage during which the lamp is heated up. Since C1 and C2 are seen by the transformer as two capacitors connected in series having voltages of opposite sign stored therein, the voltage applied to the primary of the transformer is equal to the difference between v1 and v2.

The rms value of the current iL through the lamp may be adjusted by changing the frequency at which T2 is switched: when the frequency is increased, the rms value of iL is reduced, as can readily be seen from the waveform diagram of FIG. 2b.

When operating with the inductor L1 saturated, the behavior of the circuit is modified as follows (refer now to FIG. 2c): when i1 reaches the saturation current iS (instant t21) during the current-increase stage as described with reference to FIG. 2b, L1 becomes practically a short circuit. i1 is then the sum of the current $iL = Em^2/r$ through the lamp and the magnetizing current iμ, which increases linearly with time.

When T2 is switched off (instant t22), iL falls off very quickly because L1 desaturates. C1 and C2 are then charged by the current i1 as before, and these two capacitors return to zero voltage at an instant written t23.

It may be observed here that the currents iL plotted on the waveform diagrams of FIGS. 2a to 2c are in fact the lamp currents as seen by the primary winding.

In these two operating modes (L1 saturated or not saturated), the rms current flowing through the load may be modified by changing the switching frequency of T2. It is thus easy, during the stage following the striking of an arc in the lamp, to cause the lamp to operate at a current which is higher than its nominal current for a predetermined time lasting a few seconds so as to bring the lamp up to its nominal operating temperature as quickly as possible.

In addition, and likewise in both operating modes, T2 is switched gently, i.e. as described above with reference to FIG. 2a.

As a result, the instant at which T2 is switched on is not critical insofar as it is cause to conduct while D2 is conducting.

Suitable values for the sensitive components in the circuit of FIG. 1 are listed below for VE=24 V: C1=0.7 nF; C2=470 nF; L1=0.3 mH, and PT=>0.3 mH (magnetizing inductance).

Figure 3:
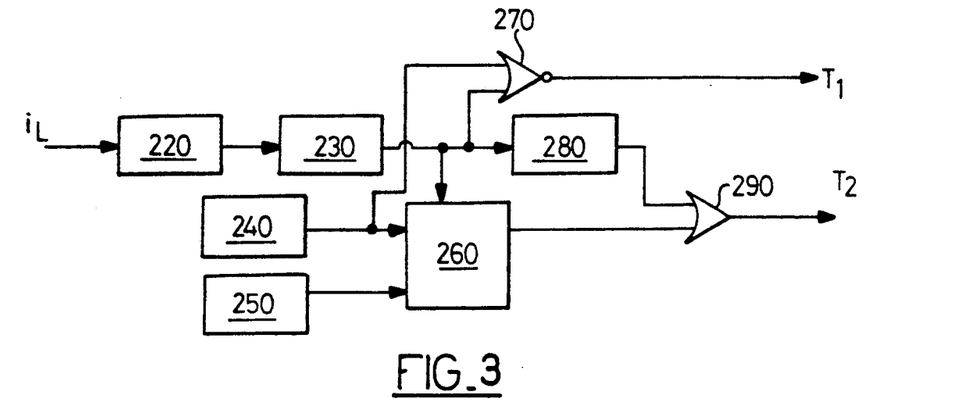
FIG. 3 is a block diagram of a control circuit for the FIG. 1 power supply circuit.

FIG. 3 is a block diagram of a circuit 200 for controlling T1 and T2. Block 220 is a current detector to which a signal representative of the value iL is applied. It applies a logic signal representative of the position of iL relative to a given threshold, e.g. about 120 mA, to a retriggerable monostable circuit 230. The outputs of two squarewave oscillators 240 and 250 operating at predetermined frequencies are applied to two inputs of a multiplexer 260, with one or other of the two frequencies being selected by means of the output signal from the monostable 230 which is applied to the select input of the multiplexer.

A NOR gate 270 receives the signals from the first oscillator 240 and from the monostable 230, and its output is applied to the grid of T1.

Finally, a second monostable 280 receives the signals from the monostable 230 and its output is connected to a first input of an OR gate 290 whose other input is connected to the output from the multiplexer 260. The output from the gate 290 constitutes the control signal for T2.

In arc-striking mode, such a circuit serves to apply complementary squarewave signals to the grids of the two transistors at the frequency f1 of the first oscillator 240, while nevertheless ensuring that T1 is switched off with a small delay relative to T2 being switched on (this being done by conventional means, not shown).

The detector 220 detects that the arc has been struck and, via the circuits 280 and 290 ensures that T2 is immediately switched on for a determined length of time so that it can satisfy the large current demand made at this instant due to the arc being established.

Thereafter, T1 is switched off and T2 is controlled at the frequency f2 provided by the second oscillator 250 (f2<f1), and with a high duty cycle ratio obtained within said oscillator.

As soon as the lamp goes out, the detector 220 switches over again and causes the control circuit to take up arc-striking mode, after a certain delay as fixed by the monostable 230.

Figure 4:
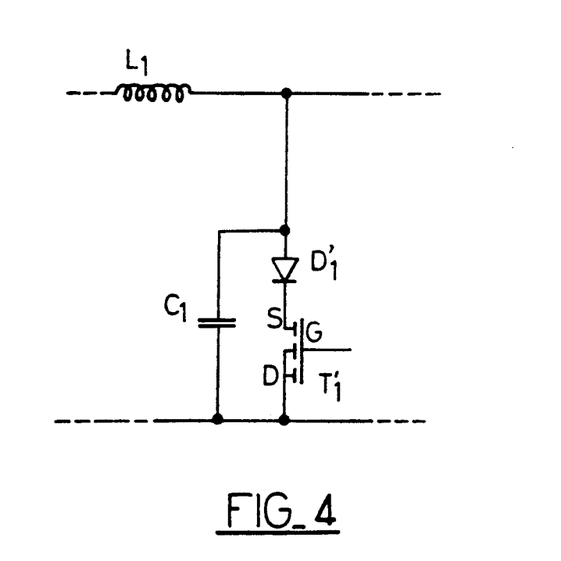
FIG. 4 is a fragmentary circuit diagram of the first variant of the FIG. 1 power supply circuit.

FIG. 4 shows a variant implementation of the power supply circuit of FIG. 1. In this variant, instead of connecting T1 and D1 in parallel, D1' and T1' are connected in series, with the anode of the diode being connected to the second terminal of L1 and with its cathode being connected to the source of T1'.

This change in the circuit has two major consequences:

Firstly, once the arc has been struck, the circuit of FIG. 1 includes periods of time during which no current is flowing through the lamp and under some circumstances this may cause the arc to be extinguished.

In contrast, with the circuit of FIG. 4, when T1 is off, the diode is no longer capable of short-circuiting the terminals of the associated capacitor. In practice, this means that the capacitor accumulates both positive and negative voltages, both of which are applied to the primary winding of the transformer.

This has the effect of causing the single halfwave in the voltage v1 as shown in FIGS. 2b and 2c continuing over time in the form of an alternating voltage which is approximately a sinewave, centered about 0, which is attenuated progressively, and which is eliminated as soon as T2 is switched on again.

Another consequence of this change in the circuit comes from the fact that the diode D1' is no longer capable of performing the same function during striking as the diode D1 in FIG. 1. The way in which T1' is controlled therefore needs to be changed accordingly if gently switching is to be retained.

A variant way of operating the FIG. 1 circuit during the initial arc-striking mode is now described with reference to FIG. 5.

In an initial situation (t0), when i1, V1, and V2 are all zero, the value of i2 is positive (obtained as explained below).

At the instant t0, the control circuit 200 switches T2 off and T1 on. As a result, i1 increases progressively in the closed circuit (E, L1), while V1 remains zero. Simultaneously i2 falls off fairly quickly, with C2 charging and V2 consequently increasing, after which C2 begins to discharge (with i2 going negative and V2 falling off).

V2 and i2 would normally continue in the form of damped sinewaves, but at instant t1, prior to the end of the first half cycle in the sinewave, the circuit 200 switches T1 off and T2 on. V2 then instantaneously becomes zero, and i1 simultaneously decreases very quickly. At the same time V1 increases very suddenly to a very high value due to the charging of using the current i2 that is discharged from C2. The positive high voltage peak V1 and the initial negative current i2 then tend to zero (instant t1') in the form of sinewaves damped in the circuit (C1, PT, T2).

Thereafter, T1 and T2 remain in the same state with the current i2 increasing again substantially linearly via PT and T2. At instant t2, the same situation arises as at t0, and a new cycle begins.

Thus, the initial phase of the cycle (between t0 and t1) causes electrical energy to be accumulated in the loop (T1, PT, C2), with V2 and i2 being in the form of damped sinewaves at a frequency determined by the values of C2 and PT, and with a little less than half of one cycle only taking place during this stage.

Thereafter, when T1 is switched off and T2 is switched on at instant t1, the high value of the discharge current during the first oscillation is used to obtain a highly energetic voltage surge V1 across the terminals of T1, by virtue of T1 being switched off suddenly.

The value of this voltage surge is very simply controlled by an appropriate choice of the instant t1.

For example, with a power supply voltage VE of 12 volts, an inductance of about 100 μH to 200 μH for PT, a capacitance of 100 nF to 500 nF for C2, and a control frequency of about 1 kHz to 5 kHz, a high tension pulse of about 1 kV can be obtained across the terminals of PT (and a pulse of about 10 kV across the terminals of L after amplification by the transformer T), at an energy of about 10 mJ, i.e. substantially greater than that obtained when applying the control described with reference to FIG. 2a.

Figure 5:
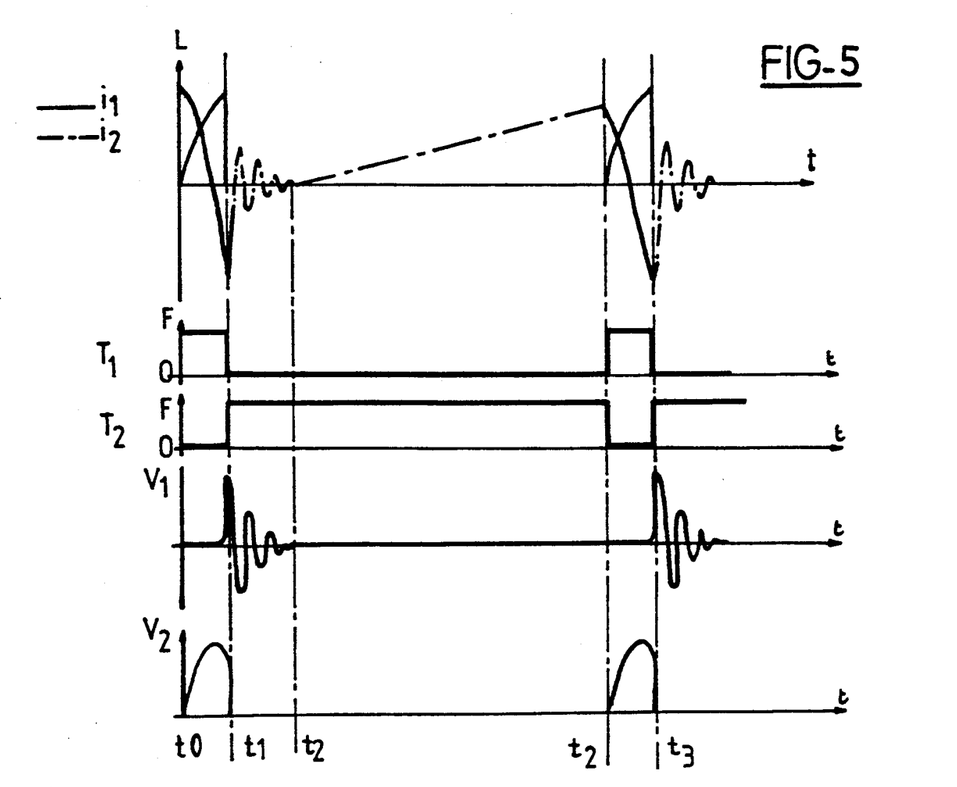
FIG. 5 is a waveform diagram showing another type of operation of the FIG. 1 circuit.

In FIG. 5, it can be seen that the voltage pulse V1 formed across the terminals of C1 after T1 has been switched off comprises a sequence of very short damped sinewaves, at a relatively high frequency determined by the capacitance of C1 and the inductance of PT.

It should be observed that the mode of operation described above requires T1 to be switched on for a short duration relative to T2, unlike the mode of operation described with reference to FIG. 2a.

An essential advantage of this variant lies in that the self inductance L1 does not contribute to obtaining the voltage surge, with only the self inductance constituted by the primary winding PT being concerned and needing the ability to take large currents. Thus, L1 can be made very cheaply since its sole function is to prevent the battery E being short-circuited when T1 is switched on.

A variant of the FIG. 1 power supply circuit is now described with reference to FIG. 6.

This variant is essentially constituted by the same items as that shown in FIG. 1, and they are designated by the same references therein and are not described again. These above-described items are accompanied by a second primary winding PT' for T, which second primary winding is connected firstly to the connection between L1 and PT and secondly to a first terminal of a switch I. The second terminal of the switch I is connected to a first terminal of a third capacitor C3, to the cathode of a third diode D3, and to the source of a third FET T3. The second terminal of C3, the anode of D3, and the drain of T3 are connected to ground. The grid of T3 is connected to the circuit 200.

During arc-striking mode as described above with reference to FIG. 5, the switch I is open and C3, D3, and T3 play no part in the operation of the circuit. The switch I must naturally be chosen to be capable of withstanding the high voltages that are generated during this stage.

During subsequent lamp-heating mode and steady state mode, I is switched on, T1 is permanently switched off and T2 and T3 are controlled in accordance with the present invention by the circuit 200 in phase opposition in "push-pull" mode.

Figure 7:
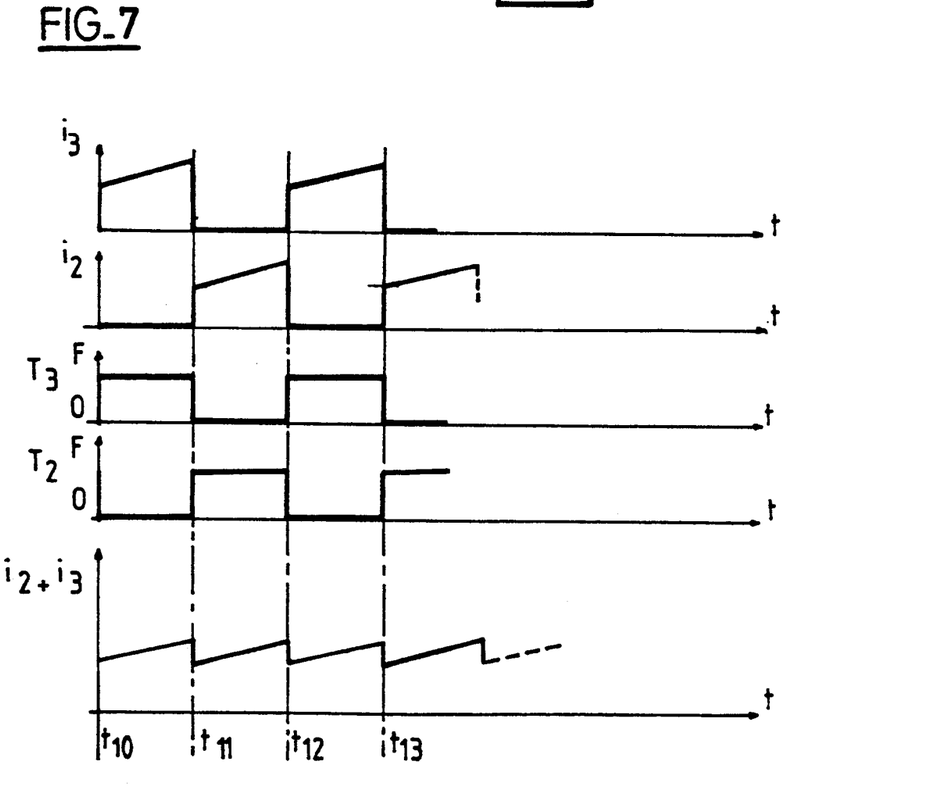
FIG. 7 is a waveform diagram showing a particular mode of operating the FIG. 6 circuit.

As shown in FIG. 7, currents i2 and i3 are thus established alternately in PT and PT' respectively, said currents changing at a relatively slow speed as determined by the (identical) inductance values of PT and PT', and by the capacitances of C2 and C3. A relatively stable current is thus obtained in the lamp secondary (i2+i3 as seen in the primary), with a form factor which is compatible with cheap power semiconductor technology.

During the lamp-heating stage, as high a current as possible should be caused to flow through the lamp, and this is done by controlling T2 and T3 as shown in FIG. 7, with the on period of each of them essentially occupying one half of a control period.

Once the lamp is hot enough, the rms value of the current is reduced by reducing the conducting times of T2 and T3, i.e. by modulating the pulse width of the transistor switch on signals in a width-reducing direction.

It may be observed here that the high form factor of the waves applied to the lamp during the heating stage when using the circuit of FIG. 1, together with the extremely high current flowing in the primary of the transformer and through T2 (typically about 30 amps) means that the component selected for T2 must be capable simultaneously of passing a very high current and must also provide good switching performance, and this makes it fairly expensive. The variant shown in FIG. 6 with the added transistor T3 makes it possible to reduce these requirements for T2, and thus make it possible to use a cheaper component.

Figure 6:
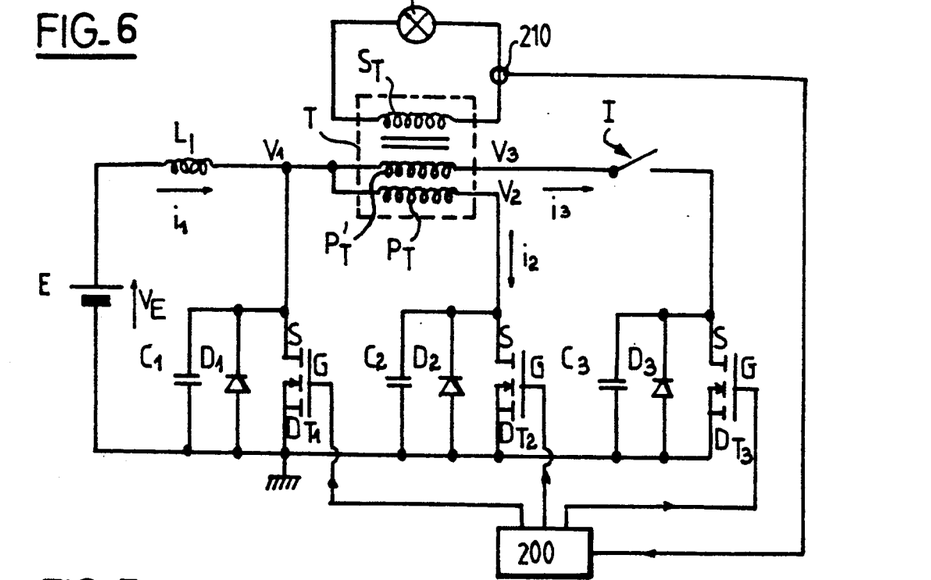
FIG. 6 is a circuit diagram of a second variant of the lamp power supply circuit of the invention.

The person skilled in the art will readily be able to modify the control circuits described above with reference to FIG. 4 for application to the power supply circuit configuration shown in FIG. 6 by providing two oscillators that are phase shifted by 180°, together with common frequency control or pulse-width control.

Figure 8:
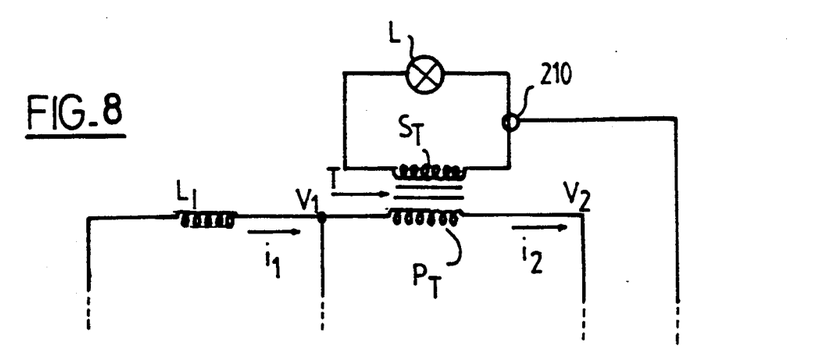
FIG. 8 is a fragmentary circuit diagram showing a portion of a third variant of the invention.

Another variant of the FIG. 1 circuit is now described with reference to FIG. 8. In this variant, a capacitor C' is connected in series with the lamp L. This variant circuit operates as follows:

During the arc-striking stage, no current flows through the secondary of T since an arc has not yet been established. As a result, C' remains permanently discharged with zero voltage across its terminals.

The arc-striking voltage striking peaks, e.g. established as described above by appropriate switching of T1 and T2, are therefore normally applied to L.

In contrast, once an arc has been established in the lamp, a high value of current tends to be established therein. By virtue of this current being detected by the detector 210, the control circuit switches off T1 on a permanent basis and switches off T2 with a high duty ratio, as described above, so as to raise the temperature of the lamp by causing it to pass a relatively high current.

During this heating stage, the capacitor C' and the leakage inductance of the secondary winding ST of the transformer together with the parasitic capacitance across the terminals of the primary winding PT constitute a resonant circuit.

Put shortly, this resonant circuit operates as follows: so long as the inductance L1 is not saturated, energy is transferred from the magnetizing inductance Lμ of the transformer (current iμ) into the capacitor C', which charges.

In contrast, when L1 is saturated, this energy accumulated in C' is restored to the lamp, and the capacitor discharge current is applied to the lamp so as to feed its arc.

Besides the capacitor C' ensures that no DC current component can be set up in the secondary winding of the transformer.

Naturally the present invention is not limited to the embodiments described and shown, and the person skilled in the art will be able to apply numerous variants or modifications lying within its scope. In particular, the various embodiments described above may be combined with one another as desired.

What is claimed is:

1. A power supply circuit for an arc lamp, in particular for a motor vehicle headlight, wherein the power supply circuit comprises:
   pulse generating means for generating first voltage pulses across the terminals of a first capacitor and for applying them to the lamp in order to strike an arc in the lamp and for generating second voltage pulses for maintaining the arc in the lamp once struck, said first and second pulses being derived from a current flowing through at least one inductance under the control of switch means comprising a first switch connected in parallel with said first capacitor and a second switch connected in parallel with a second capacitor, said switches being controlled as a function of the valve of the current flowing through the lamp, said lamp being connected between said first and second capacitors.

2. A power supply circuit according to claim 1, wherein said current flowing through at least one inductance is provided by a low voltage DC supply such as a vehicle battery and the circuit further comprises a voltage raising transformer having a primary winding connected between said first and second capacitor and a secondary winding to the terminals of which the lamp is connected.

3. A power supply circuit according to claim 2, wherein said at least one inductance and said first capacitor are connected in series across said low voltage DC supply and constitute a first pulse generator and said at least one inductance, said primary winding of the transformer and said second capacitor are connected in series across said low voltage DC supply and constitute a second pulse generator.

4. A circuit according to claim 3, further provided with first and second diodes connected in parallel respectively with the first capacitor and the first controlled switch, and with the second capacitor and the second controlled switch.

5. A circuit according to claim 3, wherein the first pulse generator further includes a first diode connected in series with the first controlled switch.

6. A circuit according to claim 3, wherein during a stage when an arc is struck in the lamp, the first and second switches are controlled by squarewave voltages which are essentially complementary and at a first frequency.

7. A circuit according to claim 6, wherein during a subsequent stage during which the arc is maintained in the lamp, the first switch is off and the second switch is controlled by a squarewave signal having a high duty ratio and at a second frequency which is lower than the first frequency.

8. A circuit according to claim 7, including means for causing said second frequency to vary, thereby varying the rms current flowing through the lamp during the arc-maintaining stage.

9. A circuit according to claim 3, wherein in order to generate a succession of high voltage pulses across the terminals of the lamp for the purpose of striking an arc therein, the switch means are cyclically controlled in order to determine a first stage during which the first switch means is on and the second switch means is off, thereby charging the said second capacitor and then establishing a reverse current flow discharging the second capacitor through the said first switch means, and a second stage during which the first switch means is suddenly turned off while the second switch means is on, thereby generating an energetic high tension pulse across the terminals of the first capacitor and applying said pulse to the primary winding of the transformer, said pulse resulting from the charge of the first capacitor due to said discharge current.

10. A circuit according to claim 9, wherein subsequent to obtaining the high voltage purse, the second stage is extended to allow current flowing through the second switch means to grow and cause the second capacitor to be charged a the beginning of the subsequent first stage.

11. A circuit according to claim 3, further including a second primary winding of the transformer connected between the voltage source and a first terminal of a third capacitor whose second terminal is connected to ground, a third controlled switch means being connected in parallel with the third capacitor, and wherein the second and third switch means are connected in phase opposition and with a variable on duration in order to establish a flow of current through the lamp which is variable as a function of the state of the lamp.

12. A circuit according to claim 11, wherein during a lamp-heating stage, after the arc has been struck, the on duration of the second and third switch means is equal to one half of the control period of said switches.

13. A circuit according to claim 3, further including a capacitor connected in series with the lamp in the secondary circuit of the transformer.

* * * * *